United States Patent
Miyamoto et al.

(10) Patent No.: US 11,045,757 B2
(45) Date of Patent: Jun. 29, 2021

(54) RECLAIMING APPARATUS, $CO_2$ RECOVERY APPARATUS INCLUDING THE SAME, AND RECLAIMING METHOD

(71) Applicant: Mitsubishi Heavy Industries Engineering, Ltd., Kanagawa (JP)

(72) Inventors: Osamu Miyamoto, Houston, TX (US); Takashi Kamijo, Kanagawa (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 394 days.

(21) Appl. No.: 16/155,981

(22) Filed: Oct. 10, 2018

(65) Prior Publication Data

US 2020/0114304 A1    Apr. 16, 2020

(51) Int. Cl.
*B01D 53/14* (2006.01)

(52) U.S. Cl.
CPC ..... *B01D 53/1425* (2013.01); *B01D 53/1412* (2013.01); *B01D 53/1418* (2013.01); *B01D 53/1475* (2013.01)

(58) Field of Classification Search
CPC .......... B01D 53/14; B01D 53/1425; B01D 53/1412; B01D 53/1418; B01D 53/1475
USPC .......................................................... 502/56
See application file for complete search history.

(56) References Cited

U.S. PATENT DOCUMENTS

| | | |
|---|---|---|
| 5,993,608 A | 11/1999 | Abry et al. |
| 8,137,441 B2 | 3/2012 | Iijima et al. |
| 8,425,849 B2 | 4/2013 | Iijima et al. |
| 8,927,450 B2 | 1/2015 | Iijima et al. |
| 2012/0125012 A1 | 5/2012 | Greer et al. |
| 2019/0030480 A1 | 1/2019 | Tanaka et al. |

FOREIGN PATENT DOCUMENTS

| | | |
|---|---|---|
| JP | H06198101 A | 7/1994 |
| JP | H06296801 A | 10/1994 |
| JP | 2008221166 A | 9/2008 |
| JP | 2011104580 A | 6/2011 |
| JP | 4875522 B2 | 2/2012 |
| JP | 2015097982 A | 5/2015 |
| JP | 2017124374 A | 7/2017 |
| WO | 2019078156 A1 | 4/2019 |
| WO | 2019078168 A1 | 4/2019 |

OTHER PUBLICATIONS

International Search Report issued in corresponding International Application No. PCT/JP2019/038307, dated Dec. 17, 2019 (13 pages).

*Primary Examiner* — Edward M Johnson
(74) *Attorney, Agent, or Firm* — Osha Bergman Watanabe & Burton LLP

(57) ABSTRACT

A reclaiming apparatus includes: a container; an absorption-liquid supply line for supplying the container with an absorption liquid containing an absorption agent; a water supply line for supplying the container with a water; a steam discharge line for discharging steam from the container; a heating device for heating a liquid containing at least one of the water or the absorption liquid; and a control device configured to determine, on the basis of a temperature of the liquid stored in the container, an ending timing of an absorption-agent recovery process of recovering steam containing the absorption agent via the steam discharge line by heating of the liquid with the heating device.

9 Claims, 5 Drawing Sheets

RECLAIMING APPARATUS, $CO_2$ RECOVERY APPARATUS INCLUDING THE SAME, AND RECLAIMING METHOD

TECHNICAL FIELD

The present disclosure relates to a reclaiming apparatus, a $CO_2$ recovery apparatus including the same, and a reclaiming method.

BACKGROUND ART

As a method of recovering $CO_2$ contained in exhaust gas from a power generation facility or the like, a chemical absorption method is often used.

In a chemical absorption method, exhaust gas containing $CO_2$ and an absorption liquid containing an absorption agent make contact, and the absorption liquid absorbs $CO_2$ in the exhaust gas. Accordingly, $CO_2$ is removed from exhaust gas. The absorption liquid having absorbed $CO_2$ releases the absorbed $CO_2$ to be regenerated, by being heated by steam or the like, and is re-utilized as an absorption liquid. As the absorption liquid is re-utilized repeatedly, impurity substances from exhaust gas and depleted materials from the absorption liquid accumulate in the absorption liquid. Reclaiming is performed to remove such depleted materials or the like accumulating in the absorption liquid from the absorption liquid.

According to Patent Document 1, the above described reclaiming includes supplying a container (absorption liquid storage part) with dilution water and an absorption liquid which has absorbed $CO_2$ in the exhaust gas, and heating the liquid (absorption liquid and dilution liquid) inside the container, thereby recovering the evaporated absorption liquid and separating condensed depleted materials in the absorption liquid from the absorption liquid.

Further, Patent Document 1 discloses measuring the amount of the absorption liquid in the liquid stored in the container during the above described reclaiming process, ending reclaiming when the measured amount of the absorption liquid reaches a predetermined value or below, and then discharging sludge containing depleted materials accumulated on the bottom of the container.

CITATION LIST

Patent Literature

Patent Document 1: U.S. Pat. No. 8,927,450B

SUMMARY

Meanwhile, it is difficult to recover the entire amount of absorption agent contained in the liquid heated in the container. Normally, a part of the absorption agent supplied to the container remains in the sludge accumulating on the bottom of the container after the reclaiming process, to be discharged outside the container with the sludge and processed. In this regard, by ending the reclaiming process after confirming that the absorption agent concentration inside the container has decreased to a predetermined value or below, it may be possible to reduce the amount of absorption agent remaining in the sludge, and suppress loss of the absorption agent.

Herein, as disclosed in Patent Document 1, in a case where the concentration of the absorption agent in the liquid inside the container is directly measured by a concentration meter or the like, it is necessary to perform pre-processing of the sample and analysis of the measurement data. Thus, it takes time to determine the concentration of absorption agent after obtaining the sample for concentration measurement. Meanwhile, the liquid in the container is continuously heated and gasified after acquisition of a liquid sample for concentration measurement, and thus the concentration of absorption agent in the liquid changes with time. Thus, in some cases where the concentration of absorption agent of the liquid in the container is directly measured, it is difficult to perform the reclaiming operation at a right time on the basis of the concentration of absorption agent in the liquid.

In view of the above, an embodiment of at least one embodiment of the present invention is to provide a reclaiming apparatus capable of performing reclaiming of an absorption liquid efficiently, a $CO_2$ recovery apparatus including the reclaiming apparatus, and a reclaiming method.

(1) According to at least one embodiment of the present invention, a reclaiming apparatus includes: a container; an absorption-liquid supply line for supplying the container with an absorption liquid containing an absorption agent; a water supply line for supplying the container with a water; a steam discharge line for discharging steam generated from the container; a heating device for heating a liquid containing at least one of the water or the absorption liquid; and a control device configured to determine an ending timing of an absorption-agent recovery process which recovers the steam containing the absorption agent via the steam discharge line by heating the liquid with the heating device based on the temperature of the liquid stored in the container.

The boiling point of the liquid inside the container containing water and the absorption liquid changes depending on the concentration of the absorption agent of the liquid. Thus, the temperature of the liquid heated by the heating device can be used as an index of the concentration of the absorption agent in the liquid. With the above configuration (1), on the basis of the temperature of the liquid heated by the heating device, it is possible to easily and quickly determine the ending timing of the absorption agent recovery process of recovering steam containing the absorption agent. Thus, it is possible to perform reclaiming of the absorption liquid more efficiently.

(2) In some embodiments, in the above configuration (1), the absorption-agent recovery process includes recovering steam containing the absorption agent via the steam discharge line, by heating the liquid with the heating device while shutting off supply of the absorption liquid to the container via the absorption-liquid supply line and supplying the container with the water via the water supply line.

With the above configuration (2), the liquid is heated while shutting off supply of the absorption liquid to the container and supplying water to the container, and thus the concentration of the absorption agent in the liquid inside the container decreases with evaporation of the liquid containing the absorption liquid due to heating. Thus, with the above configuration (2), on the basis of the temperature of the liquid inside the container, it is possible to detect a decrease in the concentration of the absorption agent in the liquid, and determine the ending timing of the absorption agent recovery process correctly.

(3) In some embodiments, in the above configuration (1) or (2), the control device is configured to determine that the absorption-agent recovery process ends when the temperature of the liquid in the container decreases to a first predetermined temperature.

Normally, an absorption liquid agent has a higher boiling point than water. Thus, when the pressure inside the container is constant, the boiling point of the liquid decreases with a decrease in the concentration of the absorption agent in the liquid. In this regard, with the above configuration (3), it is determined that recovery of the absorption agent from the liquid inside the container ends if the temperature of the liquid inside the container decreases to the first predetermined temperature, and thus it is possible to end the absorption agent recovery process after sufficiently decreasing the concentration of the absorption agent in the solvent inside the container by appropriately setting the first predetermined temperature. Accordingly, it is possible to suppress loss of the absorption liquid by reclaiming effectively.

(4) In some embodiments, in the above configuration (3), the control device is configured to set the first predetermined temperature depending on a pressure inside the container.

The boiling point of the liquid inside the container changes depending on the pressure inside the container. In this regard, with the above configuration (4), by setting the first predetermined temperature depending on the pressure inside the container, even in a case there is a change in the pressure inside the container, it is possible to set the first predetermined temperature appropriately according to the pressure, decrease the concentration of the absorption agent in the solvent inside the container sufficiently, and then end the absorption agent recovery process. Accordingly, it is possible to suppress loss of the absorption liquid by reclaiming effectively.

(5) In some embodiments, in the above configuration (3) or (4), the control device is configured to set the first predetermined temperature depending on the temperature of the liquid in the container at the start of the absorption-agent recovery process.

With the above configuration (5), even if the concentration of the absorption agent at the time of operation start is different, it is possible to achieve a target concentration of the absorption agent by changing the first predetermined temperature.

(6) In some embodiments, in any one of the above configurations (3) to (5), the control device is configured to determine an ending timing of an absorption-liquid regeneration process performed before the absorption-agent recovery process by comparing between the temperature of the liquid in the container and a second predetermined temperature which is higher than the first predetermined temperature, and the absorption-liquid regeneration process includes a process of separating non-volatile components which remains in the liquid inside the container and the absorption agent contained in the steam discharged to the steam discharge line, by heating the liquid with the heating device while the absorption liquid is supplied to the container via the absorption-liquid supply line.

In the absorption liquid regeneration process, by heating the liquid while supplying the container with the absorption liquid, the liquid containing the absorption agent inside the container is evaporated and the non-volatile component is condensed, thereby separating the absorption agent and the non-volatile component in the liquid. Herein, the boiling point of the liquid inside the container changes depending on the concentration of the non-volatile component of the liquid. Thus, the temperature of the liquid heated by the heating device can be used as an index of the concentration of the non-volatile component of the liquid.

With the above configuration (6), on the basis of the temperature of the liquid heated by the heating device, it is possible to easily and quickly determine the ending timing of the absorption agent recovery process. Thus, it is possible to perform reclaiming of the absorption liquid more efficiently.

(7) In some embodiments, in any one of the above configurations (1) to (6), the reclaiming apparatus includes a valve, installed in the water supply line, for adjusting a supply amount of water to the container. The control device is configured to stop supply of water to the container by closing the valve, if it is determined that the absorption-agent recovery process ends.

With the above configuration (7), when it is determined that the absorption agent recovery process ends, the valve is closed and supply of water to the container is stopped. Thus, when the absorption agent recovery process ends, it is possible to perform the subsequent process (e.g. process of discharging sludge from the container) quickly. Thus, it is possible to perform reclaiming of the absorption liquid more efficiently.

(8) According to at least one embodiment of the present invention, a $CO_2$ recovery apparatus includes: an absorption tower configured to cause an absorption liquid containing an absorption agent to absorb $CO_2$ in exhaust gas; a regeneration tower for regenerating the absorption liquid from the absorption tower; and the reclaiming apparatus according to any one of the above (1) to (7). At least a part of the absorption liquid stored in the regeneration tower is configured to be supplied to the container via the absorption-liquid supply line.

With the above configuration (8), on the basis of the temperature of the liquid heated by the heating device, it is possible to easily and quickly determine the ending timing of the absorption agent recovery process of recovering steam containing the absorption agent. Thus, it is possible to perform reclaiming of the absorption liquid used in the $CO_2$ recovery apparatus more efficiently.

(9) In some embodiments, in the above configuration (8), the $CO_2$ recovery apparatus further includes a reflux water drum for separating $CO_2$ containing gas released from the regeneration tower into $CO_2$ gas and condensed water. At least a part of condensed water stored in the reflux water drum is configured to be supplied as the water to the container via the water supply line.

With the above configuration (9), the condensed water separated by the reflux water drum of the $CO_2$ recovery apparatus is utilized in reclaiming of the absorption liquid, and thus it is possible to perform reclaiming more efficiently.

(10) According to at least one embodiment of the present invention, a reclaiming method includes: a step of supplying a container with an absorption liquid containing an absorption agent; a step of supplying the container with a water; heating a liquid containing at least one of the water or the absorption liquid; an absorption-agent recovery step of recovering steam which is produced by heating the liquid and which includes the absorption agent discharged from the container; and a step of determining an ending timing of the absorption-agent recovery step on the basis of a temperature of the liquid stored in the container.

The boiling point of the liquid containing water and an absorption liquid changes depending on the concentration of the absorption agent of the liquid, and thus the temperature of the liquid heated by the heating device can be used as an index of the concentration of the absorption agent in the liquid. Thus, according to the above method (10), on the basis of the temperature of the heated liquid, it is possible to easily and quickly determine the ending timing of the absorption agent recovery step of recovering steam containing the absorption agent. Thus, it is possible to perform reclaiming of the absorption liquid more efficiently.

(11) In some embodiments, in the above method (10), the absorption-agent recovery step includes recovering the steam containing the absorption agent by heating the liquid, while shutting off supply of the absorption liquid to the container and supplying the container with the water.

According to the above method (11), the liquid is heated while shutting off supply of the absorption liquid to the container and supplying water to the container, the concentration of the absorption agent in the liquid inside the container decreases with evaporation of the liquid containing the absorption liquid due to heating. Thus, according to the above method (11), on the basis of the temperature of the liquid inside the container, it is possible to detect a decrease in the concentration of the absorption agent in the liquid, and determine the ending timing of the absorption agent recovery process correctly.

(12) In some embodiments, in the above method (10) or (11), the step of determining includes determining that recovery of the absorption agent from the liquid ends if a temperature of the liquid inside the container decreases to a first predetermined temperature.

Further, the boiling point of the absorption agent has a higher boiling point than water. Thus, as the concentration of the absorption agent in the liquid decreases, the boiling point of the liquid also decreases. In this regard, according to the above method (12), it is determined that recovery of the absorption agent from the liquid inside the container ends when the temperature of the liquid inside the container decreases to the first predetermined temperature, and thus it is possible to end the absorption agent recovery process after sufficiently decreasing the concentration of the absorption agent of the solvent inside the container by appropriately setting the first predetermined temperature. Accordingly, it is possible to suppress loss of the absorption liquid by reclaiming effectively.

(13) In some embodiments, the above method (12) further includes setting the first predetermined temperature. The step of setting includes setting the first predetermined temperature depending on a pressure inside the container.

The boiling point of the liquid inside the container changes depending on the pressure inside the container. In this regard, according to the above method (13), by setting the first predetermined temperature depending on the pressure inside the container, even in a case there is a change in the pressure inside the container, it is possible to set the first predetermined temperature appropriately according to the pressure, decrease the concentration of the absorption agent in the solvent inside the container sufficiently, and then end the absorption agent recovery step. Accordingly, it is possible to suppress loss of the absorption liquid by reclaiming effectively.

(14) In some embodiments, the above method (12) or (13) further includes determining an ending timing of an absorption-liquid regeneration step performed before the absorption-agent recovery step, on the basis of a comparison between a temperature of the liquid stored in the container and a second predetermined temperature which is higher than the first predetermined temperature. The absorption-liquid regeneration step includes separating a non-volatile component which remains in the liquid inside the container and the absorption agent contained in the steam discharged from the container, by heating the liquid while the absorption liquid is supplied to the container.

In the absorption liquid regeneration step, by heating the liquid while supplying the container with the absorption liquid, the liquid containing the absorption agent inside the container is evaporated and the non-volatile component is condensed, thereby separating the absorption agent and the non-volatile component in the liquid. Herein, the boiling point of the liquid inside the container changes depending on the concentration of the non-volatile component in the liquid, and thus the temperature of the liquid heated by the heating device can be used as an index of the concentration of the non-volatile component in the liquid.

In this regard, according to the above method (14), on the basis of the temperature of the heated liquid, it is possible to easily and quickly determine the ending timing of the absorption agent recovery step. Thus, it is possible to perform reclaiming of the absorption liquid more efficiently.

(15) In some embodiments, any one of the above methods (10) to (14) further includes adjusting a supply amount of water to the container. The step of adjusting includes stopping supply of water to the container if it is determined that the absorption-agent recovery step ends in the step of determining the ending timing of the absorption agent recovery step.

According to the above method (15), when it is determined that the absorption agent recovery step ends, supply of water to the container is stopped. Thus, when the absorption agent recovery step ends, it is possible to perform the subsequent process (e.g. process of discharging sludge from the container) quickly. Thus, it is possible to perform reclaiming of the absorption liquid more efficiently.

According to at least one embodiment of the present invention, provided is a reclaiming apparatus capable performing reclaiming of an absorption liquid efficiently, a $CO_2$ recovery apparatus including the reclaiming apparatus, and a reclaiming method.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, a $CO_2$ recovery apparatus will be described, to which a reclaiming apparatus according to some embodiments is applied.

Figure 1:
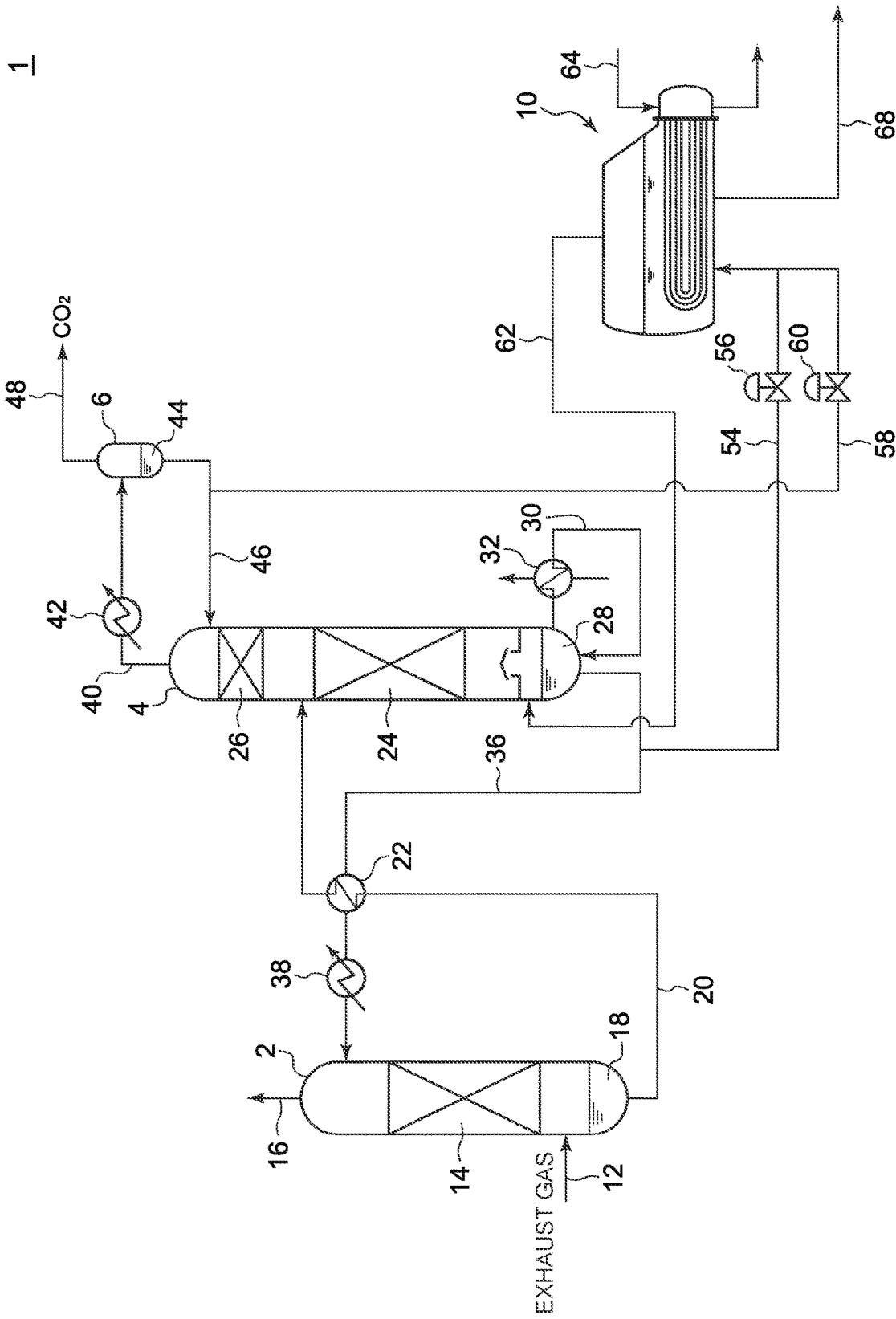
FIG. 1 is a schematic diagram of a $CO_2$ recovery apparatus to which a reclaiming apparatus according to an embodiment is applied.

FIG. 1 is a schematic diagram of a $CO_2$ recovery apparatus to which a reclaiming apparatus according to an embodiment is applied. The $CO_2$ recovery apparatus shown in FIG. 1 is a device for recovering $CO_2$ from exhaust gas discharged from a power generation facility or a factory, for instance. As depicted in the drawing, the $CO_2$ recovery apparatus 1 includes an absorption tower 2 for causing an absorption liquid to absorb $CO_2$ in exhaust gas from a power generation facility or the like, a regeneration tower 4 for regenerating the absorption liquid having absorbed $CO_2$, a reflux water drum 6 configured to separate the released gas from the regeneration tower 4 into $CO_2$ gas and condensed water, and return the condensed water to the regeneration tower 4, and a reclaiming apparatus 10 for reclaiming the absorption liquid.

Exhaust gas containing $CO_2$ is supplied to the absorption tower 2 via an exhaust gas introduction line 12. Further, a pretreatment device for pre-processing exhaust gas (desulfurization, cooling, etc.) may be installed at the upstream of the absorption tower 2, and the absorption tower 2 may be supplied with exhaust gas after treated with such pretreatment.

The absorption tower 2 includes an absorption part 14 formed by a packed layer, for instance, and the absorption part 14 is supplied with a $CO_2$ absorption liquid containing a $CO_2$ absorption agent from above.

The exhaust gas having flown into the absorption tower 2 via the exhaust gas introduction line 12 flows upward through the absorption tower 2 from the side of the tower bottom part of the absorption tower 2, and flows into the absorption part 14. Further, in the absorption part 14, exhaust gas makes counter-current contact with the $CO_2$ absorption liquid supplied from the upper part of the absorption part 14, and thereby $CO_2$ in exhaust gas is absorbed by the $CO_2$ absorption liquid.

The $CO_2$ absorption liquid may be an aqueous solution of the $CO_2$ absorption liquid.

The type of the $CO_2$ absorption agent is not particularly limited. For instance, alkanolamines such as monoethanolamine and diethanolamine, or a basic material other than amines such as sodium hydroxide, potassium hydroxide and calcium hydroxide can be used as the $CO_2$ absorption agent.

Exhaust gas deprived of $CO_2$ gas through contact with the $CO_2$ absorption liquid in the absorption part 14 is discharged outside from the tower top part 16 of the absorption tower 2.

On the other hand, the $CO_2$ absorption liquid having absorbed the $CO_2$ gas in the exhaust gas in the absorption part 14 falls onto the tower bottom part of the absorption tower 2, and is stored in the tower bottom part. The $CO_2$ absorption liquid stored in the tower bottom part of the absorption tower 2 is a rich absorption liquid 18 having a higher $CO_2$ concentration than the $CO_2$ absorption liquid described below stored in the tower bottom part of the regeneration tower 4. The rich absorption liquid 18 is supplied to the regeneration tower 4 from the absorption tower 2 via a rich liquid line 20 by a pump (not depicted) installed in the rich liquid line 20.

Further, as depicted in FIG. 1, a heat exchanger 22 for exchanging heat between the rich absorption liquid flowing through the rich liquid line 20 and the lean absorption liquid flowing through the lean liquid line 36 may be installed in the rich liquid line 20. By heating the rich absorption liquid through heat exchange with the lean absorption liquid having a relatively high temperature, it is possible to promote regeneration of the absorption liquid in the regeneration tower 4 described below.

The regeneration tower 4 includes a release part 24 that releases $CO_2$ gas from the rich absorption liquid and a cleaning part 26 which cleans the $CO_2$ gas released at the release part 24 with reflux water.

The release part 24 includes a packing material, and is supplied from the rich absorption liquid from above through the rich liquid line 20. The rich absorption liquid is heated by the steam described below, in the release part 24, releases $CO_2$ gas, and becomes a lean absorption liquid which contains a relatively low rate of $CO_2$.

The lean absorption liquid having released $CO_2$ gas at the release part 24 descends from the regeneration tower 4, and is stored in the tower bottom part of the regeneration tower 4. The lean absorption liquid 28 is supplied, via a re-boiler line 30, to a regeneration heater (re-boiler) 32 installed in the re-boiler line 30. In the regeneration heater 32, the lean absorption liquid 28 exchanges heat with a heating medium (e.g. water steam), whereby at least a part of the lean absorption liquid 28 changes in phase to saturated steam, and is supplied to the tower bottom part of the regeneration tower 4. The saturated steam produced by the regeneration heater 32 as described above flows upward through the regeneration tower 4 toward the release part 24, and is used as a heating source for heating the rich absorption liquid at the release part 24.

The lean absorption liquid (containing a lean absorption liquid that has not changed its phase in the regeneration heater 32) stored in the tower bottom part of the regeneration tower 4 is taken out from the tower bottom part of the regeneration tower 4, and is supplied to the absorption part 14 of the absorption tower 2 via the lean liquid line 36 by a feeding pump (not depicted) installed in the lean liquid line 36, thereby being re-utilized as the above described $CO_2$ absorption liquid. Further, a cooler 38 for cooling the lean absorption liquid may be installed in the lean liquid line 36.

The $CO_2$ gas released from the rich absorption liquid at the release part 24 flows upward toward the cleaning part 26 installed above the release part 24 in the regeneration tower 4. The cleaning part 26 removes the absorption agent remaining in the $CO_2$ gas as the $CO_2$ gas from the release part 24 makes gas-liquid contact with the cleaning liquid supplied from above the cleaning part 26.

The cleaning part 26 is not particularly limited as long as it is capable of promoting gas-liquid contact between $CO_2$ gas and the first cleaning liquid. For instance, the cleaning part 26 may include one or more stages of trays or a packed layer.

The $CO_2$ gas after passing through the cleaning part 26 is released from the tower top part of the regeneration tower 4, and is supplied to the $CO_2$ gas line 40. A condenser 42 is installed in the $CO_2$ gas line 40, and in the condenser 42, $CO_2$ gas is cooled and steam in the $CO_2$ gas is condensed. The $CO_2$ gas after passing through the condenser 42 is supplied to the reflux water drum 6 installed on the outlet side of the $CO_2$ gas line 40.

The reflux water drum 6 is configured to separate released gas from the regeneration tower 4 ($CO_2$-containing gas) into $CO_2$ gas and condensed water.

The condensed water 44 separated by the reflux water drum 6 is stored in the tower bottom part of the reflux water drum 6. The condensed water 44 is supplied to the cleaning part 26 of the regeneration tower 4 as a cleaning liquid, via the reflux water line 46. Further, the condensed water 44 is supplied to the reclaiming apparatus 10 described below, via the water supply line 58.

On the other hand, $CO_2$ gas separated by the reflux water drum 6 is released from the reflux water drum 6 via a recovery line 48 connected to the tower top part of the reflux water drum 6, compressed by a compressor (not depicted) installed in the recovery line 48, and is taken out of the system as product $CO_2$, for instance.

Next, a reclaiming apparatus 10 according to some embodiments will be described. The reclaiming apparatus 10 is configured to remove non-volatile components such as impure substances from exhaust gas and depleted substances of the absorption liquid accumulating due to repetitive re-utilization of the absorption liquid in the $CO_2$ recovery apparatus 1, from a $CO_2$ absorption liquid including such non-volatile components, and recover the $CO_2$ absorption agent and return the $CO_2$ absorption agent to the $CO_2$ recovery apparatus 1.

Further, reclaiming of the absorption liquid by the reclaiming apparatus 10 may be performed when the concentration of the absorption agent of the lean absorption liquid 28 or the rich absorption liquid 18 reaches a predetermined value or higher, during an operation period of the $CO_2$ recovery apparatus 1.

In the following description, a $CO_2$ absorption liquid containing a $CO_2$ absorption agent is reclaimed. Nevertheless, the absorption agent and the absorption liquid according to the present invention is not limited to this. For instance, the absorption agent may be a $H_2S$ absorption agent that absorbs $H_2S$, and the absorption liquid may be a $H_2S$ absorption liquid that contains a $H_2S$ absorption agent.

Further, in the following description, the $CO_2$ absorption agent and the $CO_2$ absorption liquid may be referred to as merely an absorption agent and an absorption liquid, respectively.

Figure 2:
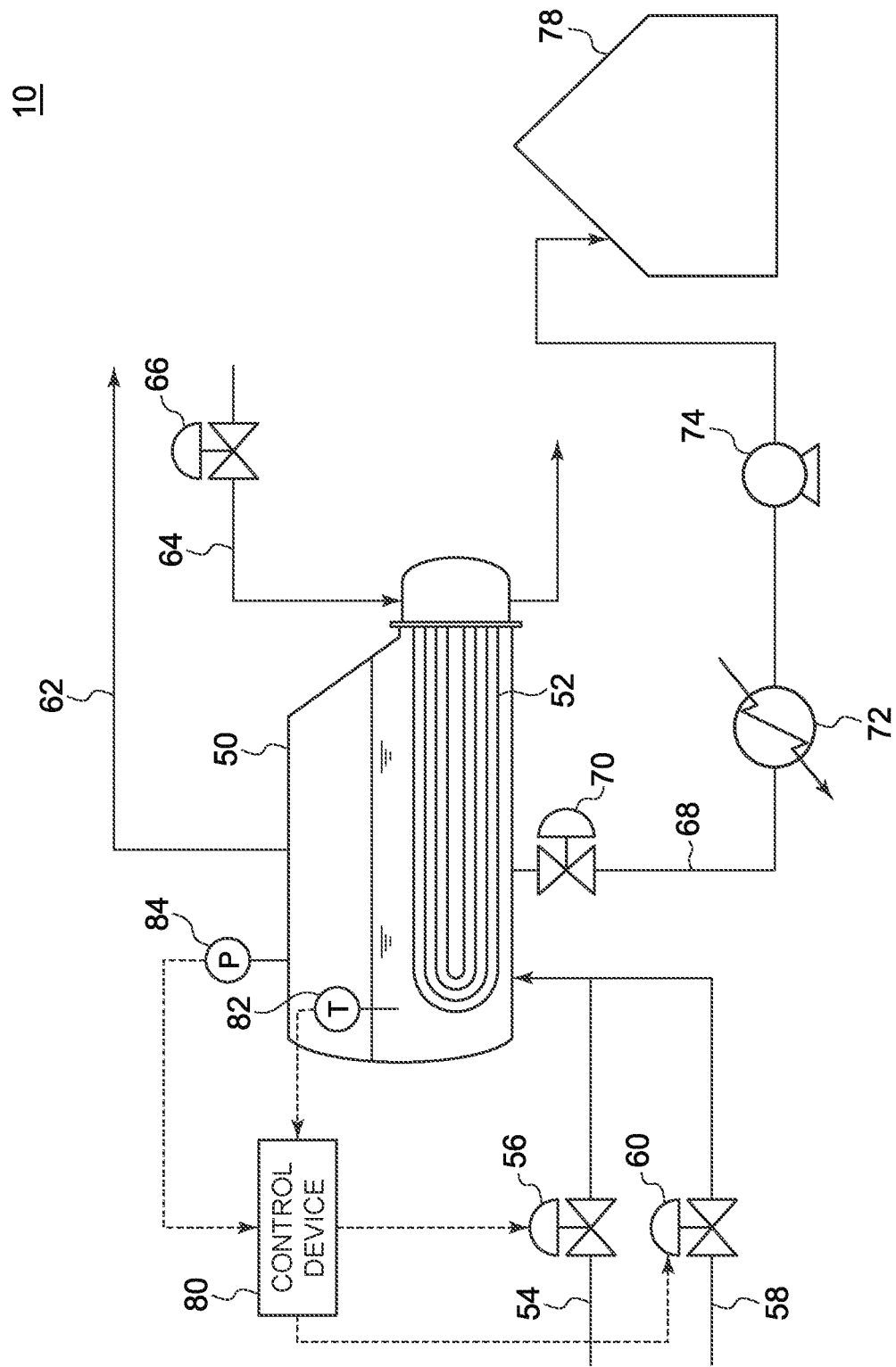
FIG. 2 is a schematic diagram of a reclaiming apparatus in a $CO_2$ recovery apparatus depicted in FIG. 1.

FIG. 2 is a schematic diagram of a reclaiming apparatus 10 in a $CO_2$ recovery apparatus 1 depicted in FIG. 1. As depicted in FIG. 2, the reclaiming apparatus 10 includes a container 50 for storing an absorption liquid and water, an absorption-liquid supply line 54 for supplying the container 50 with an absorption liquid, a water supply line 58 for supplying water to the container 50, a steam discharge line 62 for discharging steam from the container 50, and a heating device 52 for heating a liquid containing water and an absorption liquid.

Further, an absorption liquid valve 56 for adjusting the supply amount of absorption liquid to the container 50 is installed in the absorption-liquid supply line 54, and a water valve 60 (valve) for adjusting the supply amount of water to the container 50 is installed in the water supply line 58.

In some embodiments, the heating device 52 may be configured to heat a liquid inside the container through heat exchange between the liquid inside the container and a heating medium.

In an illustrative embodiment depicted in FIG. 2, the heating device 52 includes a U-shaped steam pipe installed inside the container 50. The heating device 52 is supplied with a heating medium via a heating medium via a heating medium supply line 64. Further, the heating device 52 heats a liquid inside the container through heat exchange between the liquid and the heating medium.

The heating medium supplied to the heating device 52 may be water vapor or oil, for instance.

Further, a heating medium valve 66 for adjusting the supply amount of the heating medium to the heating device 52 may be installed in the heating medium supply line 64.

In some embodiments, the heating device 52 may be configured to heat a liquid inside the container 50 by electricity.

Further, in some embodiments, the heating device 52 may be installed outside the container 50. For instance, although not depicted, the heating device 52 may be configured to heat mixture of water and an absorption liquid before being supplied to the container 50, at downstream of a merge point of the absorption-liquid supply line 54 and the water supply line 58.

As depicted in FIG. 1, a lean absorption liquid from the lean liquid line 36 is supplied to the absorption-liquid supply line 54. In the embodiment depicted in FIG. 1, the lean absorption liquid is supplied to the absorption-liquid supply line 54 from the lean liquid line 36 upstream of the heat exchanger 22. Nevertheless, in another embodiment, the lean absorption liquid may be supplied to the absorption-liquid supply line 54 from the lean liquid line 36 downstream of the heat exchanger 22.

Further, as depicted in FIG. 1, a part of the condensed water 44 stored in the reflux water drum 6 is supplied to the water supply line 58.

Further, water supplied to the container 50 is not limited to the condensed water from the reflux water drum 6. The container 50 may be supplied with water from another supply source, instead of, or in addition to, the condensed water from the reflux water drum 6.

Further, as depicted in FIG. 1, the outlet of the steam discharge line 62 is connected to the regeneration tower 4. That is, steam discharged from the container 50 is supplied to the regeneration tower 4.

The reclaiming apparatus 10 further includes a waste liquid line 68 for discharging a waste liquid from the container 50, and a waste liquid tank 78 for storing a waste liquid from the waste liquid line 68. A waste liquid valve 70, a cooler 72, and a pump 74 are installed in the waste liquid line 68.

Further, the reclaiming apparatus 10 includes a temperature sensor 82 for measuring the temperature inside the container 50, a pressure sensor 84 for measuring the pressure inside the container 50, and a control device (control device) 80 for controlling operation of the reclaiming apparatus 10.

The temperature sensor 82 may be installed in the liquid-phase part inside the container 50, and configured to measure the temperature of the liquid-phase part. The pressure sensor 84 may be installed in the gas-phase part inside the container 50.

The control device 80 includes, for instance, a central processing unit (CPU), a random access memory (RAM), a read only memory (ROM), and a storage medium or the like that is readable with a computer. Further, the series of processes for realizing the various functions is stored in the storage medium or the like in the form of program, for instance. As the CPU reads the program out to the RAM or the like and executes processing and calculation of information, various functions are realized.

The control device 80 is configured to receive measurement results of the temperature sensor 82 and the pressure sensor 84. Further, the control device 80 may be configured to perform an open-close control or an opening-degree control on various valves including the absorption liquid valve 56 and the water valve 60, for instance.

Hereinafter, described is a procedure of reclaiming the absorption liquid by using the reclaiming apparatus 10 having the above configuration. Herein, FIG. 3 is a flowchart of an example of the procedure of a reclaiming method according to an embodiment.

In the reclaiming method described below, the open-close control of the valves and determination of the ending timing of each step (absorption liquid regeneration step and absorption agent recovery step), for instance, may be executed by the above described control device 80.

Figure 3:
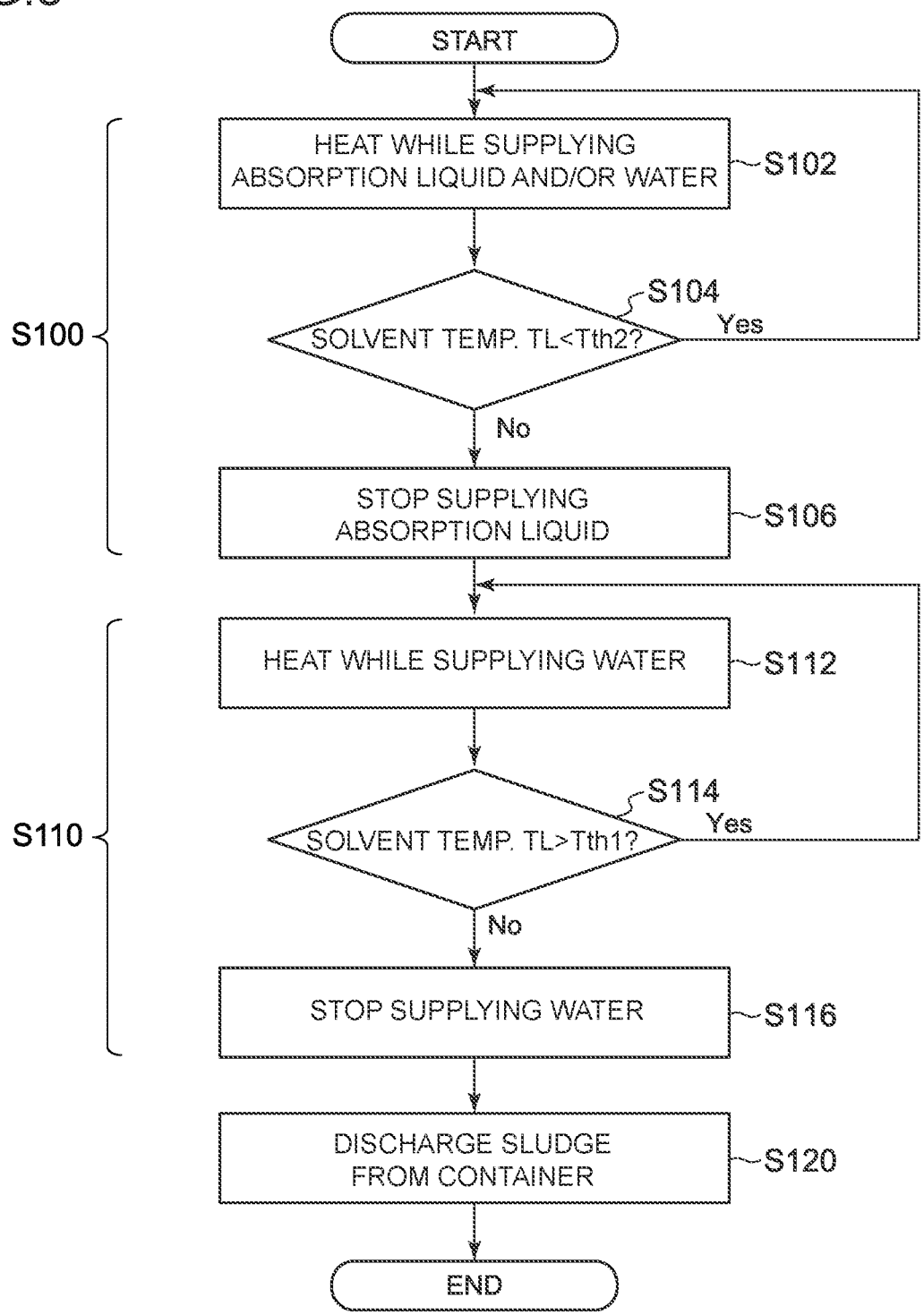
FIG. 3 is a flowchart of an example of the procedure of a reclaiming method according to an embodiment.

As depicted in FIG. 3, in the reclaiming method according to an embodiment, firstly, an absorption liquid regeneration (reclaiming) step (process) is performed (step S100), then, an absorption liquid recovery step (process) is performed (step S110), and then a discharge step is performed (step S120).

In the absorption liquid regeneration step (S100), firstly, the absorption liquid valve 56 and the water valve 60 are opened, and the absorption liquid and water are supplied to the container 50. Next, the heating medium valve 66 is opened, and supply of a heating medium (e.g. steam) to the heating device 52 is started. Further, while supplying at least one of the absorption liquid or water to the container 50 (typically, supplying both of the absorption liquid and water), the liquid inside the container 50 (mixture of the absorption liquid and water) is heated, and the non-volatile component (depleted materials of the absorption liquid or the like) remaining tin the liquid inside the container 50 and the absorption agent contained in the steam discharged to the steam discharge line 62 are separated (step S102).

In step S102, a liquid inside the contained is heated by the heating device 52, and the non-volatile component (absorption agent and water) in the liquid are evaporated. The steam containing the absorption agent produced in the container 50 is discharged from the container 50 via the steam discharge line 62. On the other hand, the non-volatile component contained in the liquid accumulates inside the container 50 even when the liquid is heated, and concentrated in the liquid inside the container 50 with time. Accordingly, the absorption agent contained in the liquid and the non-volatile component are separated.

Further, steam containing the absorption agent discharged from the container 50 via the steam discharge line 62 is returned to the regeneration tower 4 of the $CO_2$ recovery apparatus 1. The absorption agent returned to the regeneration tower 4 is used again as an absorption liquid that absorbs $CO_2$ in the $CO_2$ recovery apparatus 1.

In step S102, the container 50 may be supplied with the absorption liquid and/or water, so that the liquid-surface level inside the container 50 falls within a predetermined range. Further, the opening degrees of the absorption liquid valve 56 and the water valve 60 may be adjusted so that the ratio of the absorption liquid to the container 50 to the supply amount of water is at a predetermined value.

Further, the temperature and the supply amount of the heating medium supplied to the heating device 52 may be set so that a liquid that contains the absorption liquid and water inside the container 50 is boiling.

Next, the temperature TL of a liquid stored inside the container 50 is obtained by the temperature sensor 82, and the ending timing of the absorption liquid regeneration step S100 is determined on the basis of the temperature TL.

Specifically, the temperature T1 of the above described liquid is compared to the second predetermined temperature Tth2 (step S104). Further, the second predetermined temperature Tth2 is higher than the first predetermined temperature Tth1 described below.

Further, in a case where the above described temperature TL of the liquid is lower than the second predetermined temperature Tth2 (No in step S104), the absorption liquid regeneration step S100 is not ended, and the step S102 is continued. That is, while supplying the container 50 with the absorption liquid and water, a step of heating the liquid inside the container 50 is continued, and the non-volatile component contained in the liquid inside the container 50 is condensed even further.

On the other hand, when the above described temperature TL of the liquid increases and reaches the second predetermined temperature Tth2 (Yes in step S104), it is determined that it is the ending timing of the absorption liquid regeneration step S100. Accordingly, the absorption liquid valve 56 is closed, and supply of the absorption liquid to the container 50 is stopped (step S106).

The boiling point of the liquid inside the container 50 changes depending on the concentration of the non-volatile component in the liquid. Specifically, the higher the concentration of the non-volatile component in the liquid, the higher the boiling point of the liquid. Thus, the temperature of the liquid heated by the heating device 52 can be used as an index of the non-volatile component of the liquid.

Further, as the temperature difference between the liquid in the container 50 and the heating medium becomes small, the amount of heat exchange decreases. Thus, the non-volatile component is less likely to be condensed further in the liquid.

Thus, by setting the second predetermined temperature Tth2 appropriately and comparing the temperature TL of the liquid inside the container 50 to the second predetermined temperature Tth2, it is possible to determine whether the non-volatile component is condensed sufficiently in the liquid inside the container 50. Thus, on the basis of the temperature of the liquid inside the container 50, it is possible to determine the ending timing of the above described absorption liquid regeneration step S100 easily and quickly.

Once the above described absorption liquid regeneration step (step S100) ends, the absorption liquid recovery step is performed (step S110).

In the absorption liquid recovery step (S110), by supplying the container 50 with water (condensed water from the reflux water drum 6, or the like) via the water supply line 58 and heating the liquid with the heating device 52 in a state where supply of the absorption liquid from the absorption-liquid supply line 54 is shut off, the absorption agent remaining in the liquid is evaporated together with water. The steam containing the absorption agent produced in the container 50 is discharged (recovered) from the container 50 via the steam discharge line 62 (step S112).

In step S112, the container 50 may be supplied with water, so that the liquid-surface level inside the container 50 falls within a predetermined range.

Further, the temperature and the supply amount of the heating medium supplied to the heating device 52 may be set so that a liquid that contains the absorption liquid and water inside the container 50 is boiling.

In step S112, the absorption liquid is not supplied to the container 50, and thus the concentration of the non-volatile component contained in the liquid does not basically change. Furthermore, in step S112, the volatile component containing the absorption agent in the liquid is volatilized while supplying water to the container 50, and thus the concentration of the absorption agent in the liquid decreases.

Next, the temperature TL of a liquid stored inside the container 50 is obtained by the temperature sensor 82, and the ending timing of the absorption liquid recovery step (S110) is determined on the basis of the temperature TL.

Specifically, the temperature TL of the above described liquid is compared to the first predetermined temperature Tth1 (step S114).

Further, in a case where the above described temperature TL of the liquid is higher than the first predetermined temperature Tth1 (No in step S114), the absorption liquid recovery step S110 is not ended, and the step S112 is continued. That is, while supplying the container 50 with water, a step of heating the liquid inside the container 50 is continued, and the concentration of the absorption agent contained in the liquid inside the container 50 is further reduced.

On the other hand, when the above described temperature TL of the liquid decreases and reaches the first predetermined temperature Tth1 (Yes in step S104), it is determined that it is the ending timing of the absorption liquid recovery step S110, and the water valve 60 is closed, and supply of water to the container 50 is stopped (step S116). Further, the heating medium valve 66 is closed, and supply of the heating medium to the heating device 52 is stopped, thereby stopping heating the liquid inside the container 50.

The boiling point of the liquid inside the container 50 containing water and the absorption liquid changes depending on the concentration of the absorption agent of the liquid. Further, the boiling point of the absorption agent (amines or the like) has a higher boiling point than water. Thus, the higher the concentration of the absorption agent in the liquid, the higher the boiling point of the liquid. Thus, the temperature of the liquid heated by the heating device 52 can be used as an index of the absorption agent of the liquid.

Thus, by setting the first predetermined temperature Tth1 appropriately and comparing the temperature TL of the liquid inside the container 50 to the first predetermined temperature Tth1, it is possible to determine readily and quickly whether the concentration of the absorption agent is condensed sufficiently in the liquid inside the container 50.

Further, it is possible to end the absorption agent recovery step (S110) after the concentration of the absorption agent in the liquid inside the container 50 is sufficiently reduced, and thus it is possible to reduce the loss due to discharge to the outside of the system of the absorption agent entrained by the waste liquid discharged from the container 50 in the subsequent discharge step S120.

Further, in step S102 or step S112, when the liquid inside the container 50 is heated, a strong alkaline material such as caustic soda may be added to the liquid to recover the absorption liquid.

Inside the container 50, strong acidic materials in the depleted materials in the absorption liquid may react with the absorption agent (amines or the like) and produce thermally stable salts. Thus, a strong alkaline material is added as described above to bond the strong alkaline material with the strong acidic materials constituting the thermally stable salts with the absorption agent. In this way, it is possible to liberate and recover the weak alkaline absorption agent.

In the discharge step (S120), the waste liquid valve 70 is opened, and the pump 74 installed in the waste liquid line 68 is started. Accordingly, the waste liquid containing reclaiming sludge remaining in the container 50 after completion of the absorption liquid recovery step S110 is discharged from the container 50, and is sent to the waste liquid tank 78 via the waste liquid line 68.

The waste liquid discharged from the container 50 may be cooled by the cooler 72 installed in the waste liquid line 68, and then sent to the waste liquid tank 78.

When discharge of the waste liquid from the container 50 and transportation of the waste liquid to the waste liquid tank 78 are completed, the pump 74 is stopped and the waste liquid valve 70 is closed, thereby ending the discharge step.

According to the above described reclaiming method, on the basis of the temperature of the liquid heated by the heating device 52, it is possible to easily and quickly determine the ending timing of the absorption liquid regeneration step (step S100) of separating the absorption agent and the non-volatile component from the liquid inside the container 50, and the absorption agent recovery step (S110) of recovering steam containing the absorption agent. Thus, it is possible to perform reclaiming of the absorption liquid more efficiently.

Further, by using the control device 80 configured to perform the above described reclaiming method, it is possible to automatically determine the ending timing of the absorption liquid regeneration step (S100) and the absorption agent recovery step (S110) on the basis of the temperature obtained by the temperature sensor 82. Further, when it is determined that the absorption liquid regeneration step (S100) and the absorption agent recovery step (S110) are ended, it is possible to automatically proceed to the subsequent step by performing an appropriate open-close control on the absorption liquid valve 56, the water valve 60, and/or the waste liquid valve 70. Thus, it is possible to perform reclaiming of the absorption liquid more efficiently.

Further, normally, during operation of the $CO_2$ recovery apparatus 1, the pressure of the absorption tower 2 is constant, and thus the pressure inside the container 50 being in communication with the absorption tower 2 via the steam discharge line 62 is also constant. Thus, at a specific pressure inside the container 50, the temperature of the liquid inside the container 50 and the concentration of the non-volatile material or the absorption agent in the liquid have a specific correlation relationship. Thus, as described above, the liquid temperature inside the container 50 can be used as an index of the concentration of the non-volatile material or the absorption agent in the liquid, and thus it is possible to appropriately determine the ending timings of the absorption agent recovery step (S110) and the absorption liquid regeneration step (S100) by using the temperature thresholds (the first predetermined temperature and the second predetermined temperature).

The first predetermined temperature Tth1 for determining the end of the absorption liquid recovery step (S110) may be set depending on the pressure inside the container 50.

Setting the first predetermined temperature Tth1 depending on the pressure inside the container 50 will be described with reference to FIGS. 4 and 5.

Figure 4:
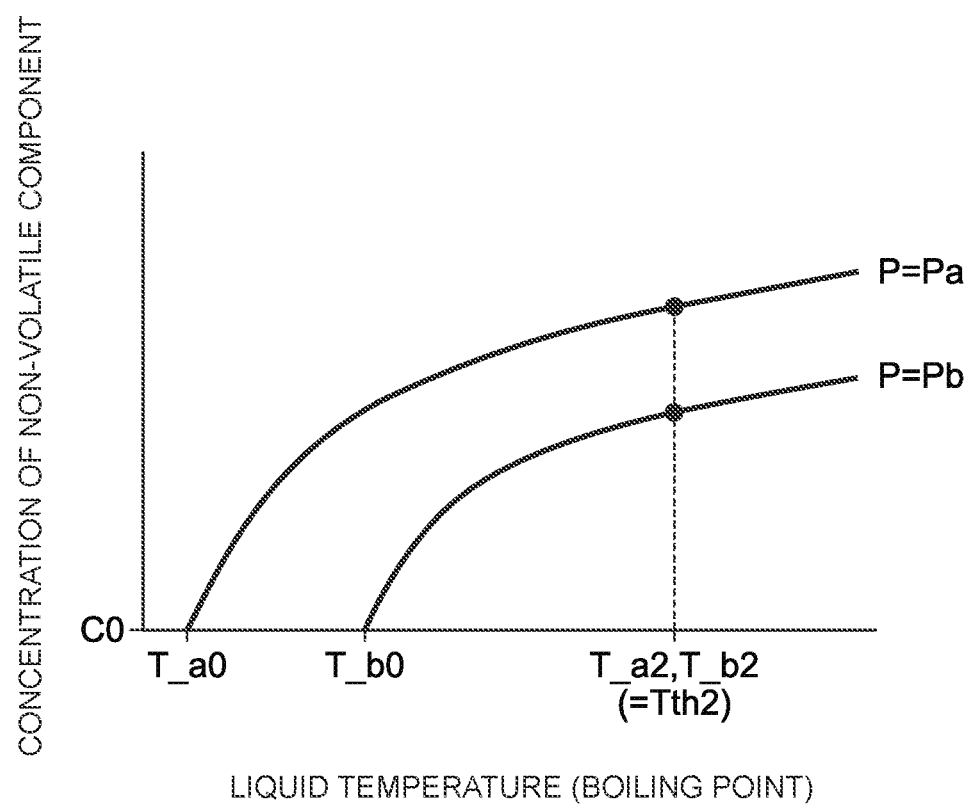
FIG. 4 is a graph showing an example of a correlation relationship between the temperature of a liquid in a container and the non-volatile component in the liquid.

FIG. 4 is a graph showing an example of a correlation relationship between the boiling point of the liquid inside the container 50, and the concentration of the non-volatile component in the liquid, at the time when the pressure inside the container 50 is Pa and Pb, respectively. Herein, the pressure Pa is smaller than the pressure Pb (Pa<Pb).

Figure 5:
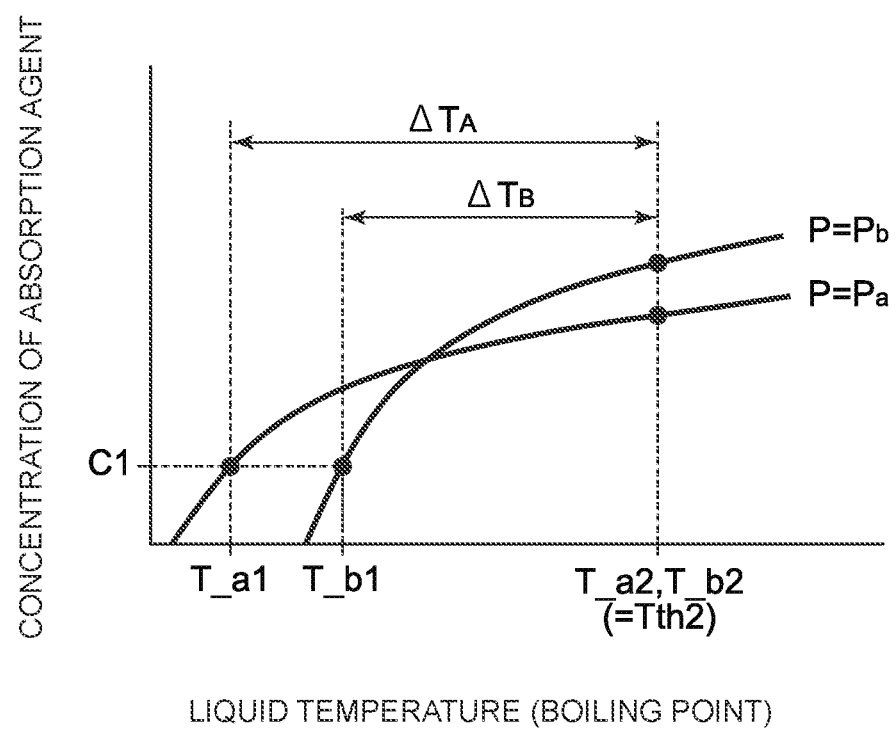
FIG. 5 is a graph showing an example of correlation relationship between the temperature of a liquid inside a container and the concentration of the absorption agent in the liquid.

FIG. 5 is a graph showing an example of a correlation relationship between the boiling point of the liquid inside the container 50 (i.e. the temperature of the liquid), and the concentration of the absorption agent in the liquid, at the time when the pressure inside the container 50 is Pa and Pb, respectively. The pressures Pa, Pb are the same as the pressures Pa, Pb in FIG. 4.

In the following description, the liquid inside the container 50 is sufficiently heated, and the temperature of the liquid is the same as the boiling point of the liquid.

In the absorption liquid regeneration step (S100) performed before the absorption liquid recovery step (S110), the non-volatile component is gradually condensed in the liquid inside the container 50, and thus the concentration of the non-volatile component in the liquid increases gradually.

With reference to the graph in FIG. 4, at the start time of the absorption liquid regeneration step (S100), the concentration of the non-volatile component is low (the concentration at this time is C0), and the solution temperature in the liquid is T a0 when the pressure inside the container is Pa, and T b0 when the pressure inside the container is Pb.

Further, as the concentration of the non-volatile component in the liquid increases with heating of the liquid, the boiling point of the liquid increases accordingly, and the temperature of the liquid in the container 50 increases.

Herein, the ending timing of the absorption liquid regeneration step (S110) may be determined on the basis of the second predetermined temperature Tth2, which is a threshold that does not depend on the pressure.

That is, in both of the cases where the pressure inside the container is Pa and Pb, when the liquid temperature inside the container 50 reaches the second predetermined temperature Tth2, it may be determined that the concentration of the non-volatile component in the liquid has increased sufficiently and the absorption liquid regeneration step (S100) ended. At this time, the temperature $T\_a2$ (the pressure inside the container is Pa), and the temperature $T\_b2$ (the pressure inside the container is Pb) at the end of the absorption liquid regeneration step (S100) are equal to Tth2, regardless of the pressure inside the container.

Next, with reference to FIG. 5, the temperature at the start of the absorption liquid regeneration step (S110) is the same as the temperature at the end of the absorption liquid regeneration step (S100), and is $T\_a2$ when the pressure inside the container is Pa, and $T\_b2$ when the pressure inside the container is Pb. As described above, $T\_a2$ and $T\_b2$ are the same as Tth2.

Herein, as depicted in FIG. 5, the boiling point of the liquid (temperature of the liquid) decreases with a decrease in the concentration of the absorption agent. The correlation relationship between the concentration of the absorption agent in the liquid inside the container 50 and the boiling point (temperature of the liquid) differs depending on the pressure inside the container. Thus, for instance, in a case where the absorption liquid recovery step (S110) should be ended at the time when the concentration of the absorption agent in the liquid decreases sufficiently to C1, the boiling point of the liquid (temperature of the liquid) corresponding to the concentration C1 also differs depending on the pressure. In the graph of FIG. 5, the boiling point of the liquid corresponding to the above described concentration C1 is $T\_a1$ when the pressure inside the cylinder is Pa, and is $T\_b1$ when the pressure inside the cylinder Pb. Further, in the graph of FIG. 5, $T\_a1 < T\_b1$.

Thus, depending on the pressure inside the cylinder, the first predetermined temperature Tth1 is set appropriately, according to the corresponding pressure.

For instance, for the pressure Pa inside the container, the first predetermined temperature Tth1 is set to be $T\_a1$, and for the pressure Pb inside the container, the first predetermined temperature Tth1 is set to be $T\_b1$. In this case, the temperature inside the container at the end of the absorption liquid recovery step (S110) is $T\_a1$, and $T\_b1$, respectively.

In this case, the temperature threshold for determining the ending timing of the absorption liquid recovery step (S110) is the first predetermined threshold Tth1, which is a temperature value. As the above threshold, the temperature difference from the start of the absorption liquid recovery step (S110) may be used.

For instance, when the pressure inside the container is Pa, the difference $\Delta Ta$ between the liquid temperature $T\_a2$ at the start of the absorption liquid recovery step (S110) and the liquid temperature $T\_a1$ corresponding to the absorption agent concentration C1 may be set as a threshold ($\Delta Ta = T\_a2 - T\_a1$), and it may be determined that the absorption liquid recovery step (S110) ends when the liquid temperature decreases by $\Delta Ta$ from the start of the absorption liquid recovery step (S110).

Also when the pressure is Pb, the difference $\Delta Tb$ between the liquid temperature $T\_b2$ at the start of the absorption liquid recovery step (S110) and the liquid temperature $T\_b1$ corresponding to the absorption agent concentration C1 may be set as a threshold ($\Delta Tb = T\_b2 - T\_b1$), and it may be determined that the absorption liquid recovery step (S110) ends when the liquid temperature decreases by $\Delta Tb$ from the start of the absorption liquid recovery step (S110).

As described above, also in a case where the temperature difference from the start of the absorption liquid recovery step (S110) is used as a threshold, it is possible to set an appropriate threshold $\Delta T$ depending on the pressure ($\Delta Ta$ or $\Delta Tb$ described above).

As described above, by setting the first predetermined temperature Tth1 or $\Delta T$ corresponding to the pressure inside the container 50, even in a case there is a change in the pressure inside the container 50, it is possible to set the first predetermined temperature Tth1 or $\Delta T$ appropriately according to the pressure, decrease the concentration of the absorption agent of the solvent in the container 50 sufficiently, and then end the absorption agent recovery process. Accordingly, it is possible to suppress loss of the absorption liquid by reclaiming effectively.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 $CO_2$ recovery apparatus
2 Absorption tower
4 Regeneration tower
6 Reflux water drum
10 Reclaiming apparatus
12 Exhaust gas introduction line
14 Absorption part
16 Tower top part
18 Rich absorption liquid
20 Rich liquid line
22 Heat exchanger
24 Release part
26 Cleaning part
28 Lean absorption liquid
30 Re-boiler line
32 Regeneration heater 36 Lean liquid line
38 Cooler
40 $CO_2$ gas line
42 Condenser
44 Condensed water
46 Reflux water line
48 Recovery line
50 Container
52 Heating device
54 Absorption-liquid supply line
56 Absorption liquid valve
58 Water supply line
60 Water valve (valve)
62 Steam discharge line
64 Heating medium supply line
66 Heating medium valve
68 Waste liquid line
70 Waste liquid valve
72 Cooler
74 Pump
78 Waste liquid tank
80 Control device
82 Temperature sensor
84 Pressure sensor

The invention claimed is:

1. A reclaiming apparatus, comprising:
a container;
an absorption-liquid supply line for supplying the container with an absorption liquid containing an absorption agent;
a water supply line for supplying the container with a water;
a steam discharge line for discharging steam generated from the container;
a heating device for heating a liquid containing at least one of the water or the absorption liquid; and
a control device configured to determine an ending timing of an absorption-agent recovery process which recovers the steam containing the absorption agent via the steam discharge line by heating the liquid with the heating device based on the temperature of the liquid stored in the container.

2. The reclaiming apparatus according to claim 1,
wherein the absorption-agent recovery process includes recovering steam containing the absorption agent via the steam discharge line, by heating the liquid with the heating device while supply of the absorption liquid to the container via the absorption-liquid supply line is shut off and while the container is supplied with the water via the water supply line.

3. The reclaiming apparatus according to claim 1,
wherein the control device is configured to determine that the absorption-agent recovery process ends when the temperature of the liquid in the container decreases to a first predetermined temperature.

4. The reclaiming apparatus according to claim 3,
wherein the control device is configured to set the first predetermined temperature depending on a pressure inside the container.

5. The reclaiming apparatus according to claim 3,
wherein the control device is configured to set the first predetermined temperature depending on the temperature of the liquid in the container at the start of the absorption-agent recovery process.

6. The reclaiming apparatus according to claim 3,
wherein the control device is configured to determine an ending timing of an absorption-liquid regeneration process performed before the absorption-agent recovery process by comparing between the temperature of the liquid in the container and a second predetermined temperature which is higher than the first predetermined temperature, and
wherein the absorption-liquid regeneration process includes a process of separating non-volatile components which remains in the liquid inside the container and the absorption agent contained in the steam discharged to the steam discharge line, by heating the liquid with the heating device while the absorption liquid is supplied to the container via the absorption-liquid supply line.

7. The reclaiming apparatus according to claim 1,
further comprising a valve, installed in the water supply line, for adjusting a supply amount of water to the container,
wherein the control device is configured to stop supply of water to the container by closing the valve, if it is determined that the absorption-agent recovery process ends.

8. A $CO_2$ recovery apparatus, comprising:
an absorption tower configured to remove $CO_2$ in exhaust gas by contacting with an absorption liquid containing an absorption agent;
a regeneration tower for regenerating the absorption liquid from the absorption tower; and
the reclaiming apparatus according to claim 1,
wherein the $CO_2$ recovery apparatus is configured such that at least a part of the absorption liquid stored in the regeneration tower is supplied to the container via the absorption-liquid supply line.

9. The $CO_2$ recovery apparatus according to claim 8,
further comprising a reflux water drum for separating $CO_2$ containing gas released from the regeneration tower into $CO_2$ gas and condensed water,
wherein the $CO_2$ recovery apparatus is configured at least a part of condensed water stored in the reflux water drum is supplied as the water to the container via the water supply line.

* * * * *